(12) United States Patent
Vietzke et al.

(10) Patent No.: US 9,630,506 B2
(45) Date of Patent: Apr. 25, 2017

(54) CONDUCTOR ARRANGEMENT FOR PRODUCING AN ELECTROMAGNETIC FIELD AND ROUTE FOR VEHICLES, IN PARTICULAR FOR ROAD AUTOMOBILES, COMPRISING THE CONDUCTOR ARRANGEMENT

(75) Inventors: Oliver Vietzke, Berlin (DE); Robert Czainski, Szczecin (PL)

(73) Assignee: Bombardier Transportation GmbH, Berlin (DE)

( * ) Notice: Subject to any disclaimer, the term of this patent is extended or adjusted under 35 U.S.C. 154(b) by 398 days.

(21) Appl. No.: 14/232,130

(22) PCT Filed: Jul. 13, 2012

(86) PCT No.: PCT/EP2012/063821
§ 371 (c)(1),
(2), (4) Date: Jan. 10, 2014

(87) PCT Pub. No.: WO2013/007825
PCT Pub. Date: Jan. 17, 2013

(65) Prior Publication Data
US 2014/0238804 A1 Aug. 28, 2014

(30) Foreign Application Priority Data

Jul. 13, 2011 (GB) .................................. 1112098.7

(51) Int. Cl.
*B60L 5/00* (2006.01)
*B60M 7/00* (2006.01)
(Continued)

(52) U.S. Cl.
CPC ............... *B60L 5/005* (2013.01); *B60L 1/003* (2013.01); *B60L 3/003* (2013.01); *B60L 5/00* (2013.01); *B60L 9/24* (2013.01); *B60L 11/182* (2013.01); *B60L 11/1831* (2013.01); *B60M 7/003* (2013.01); *H01B 13/06* (2013.01); *B60L 2200/26* (2013.01); *B60L 2240/36* (2013.01);
(Continued)

(58) Field of Classification Search
CPC ........... B60L 5/00; B60L 5/005; B60L 11/182
See application file for complete search history.

(56) References Cited

U.S. PATENT DOCUMENTS 4,836,344 A 6/1989 Bolger
5,207,304 A 5/1993 Lechner et al.
(Continued)

FOREIGN PATENT DOCUMENTS

CH WO 2011076435 A1 * 6/2011 ............. B60L 5/005
DE 2139848 2/1973
(Continued)

*Primary Examiner* — Zachary Kuhfuss
(74) *Attorney, Agent, or Firm* — The Webb Law Firm

(57) ABSTRACT

A conductor arrangement for producing an electromagnetic field and thereby transferring energy to vehicles driving on a surface of a route, in particular for transferring energy to road automobiles is disclosed. The conductor arrangement includes a first, lower coating layer, a second upper coating layer, and at least one electric line which—if arranged as part of the route—extends under the surface of the route in and/or about the travelling direction of the vehicles. The at least one electric line is arranged in between the lower and upper coating layer.

17 Claims, 5 Drawing Sheets

(51) Int. Cl.
  *B60L 11/18* (2006.01)
  *B60L 1/00* (2006.01)
  *B60L 3/00* (2006.01)
  *B60L 9/24* (2006.01)
  *H01B 13/06* (2006.01)
(52) U.S. Cl.
  CPC ... *B60L 2240/525* (2013.01); *B60L 2270/142* (2013.01); *Y02T 10/7005* (2013.01); *Y02T 10/7072* (2013.01); *Y02T 90/12* (2013.01); *Y02T 90/121* (2013.01); *Y02T 90/122* (2013.01); *Y02T 90/125* (2013.01); *Y02T 90/14* (2013.01)

(56) References Cited

U.S. PATENT DOCUMENTS

| | | | |
|---|---|---|---|
| 6,189,664 B1 * | 2/2001 | Siciliano | B60M 1/103 191/14 |
| 6,407,470 B1 | 6/2002 | Seelig | |
| 2007/0089956 A1 * | 4/2007 | Kozsar | B60M 7/00 191/10 |
| 2011/0017531 A1 * | 1/2011 | Re Fiorentin | B60L 5/42 180/65.1 |
| 2014/0151175 A1 * | 6/2014 | Vietzke | B60L 5/005 191/10 |
| 2015/0225906 A1 * | 8/2015 | Curran | B60L 11/182 404/1 |

FOREIGN PATENT DOCUMENTS

| | | |
|---|---|---|
| DE | 19746919 A1 | 5/1999 |
| EP | 1366550 B1 | 9/2004 |
| WO | 9530556 A2 | 11/1995 |
| WO | 2010031596 A2 | 3/2010 |
| WO | 2011046414 A2 | 4/2011 |
| WO | 2011062452 A2 | 5/2011 |
| WO | 2011074861 A2 | 6/2011 |

* cited by examiner

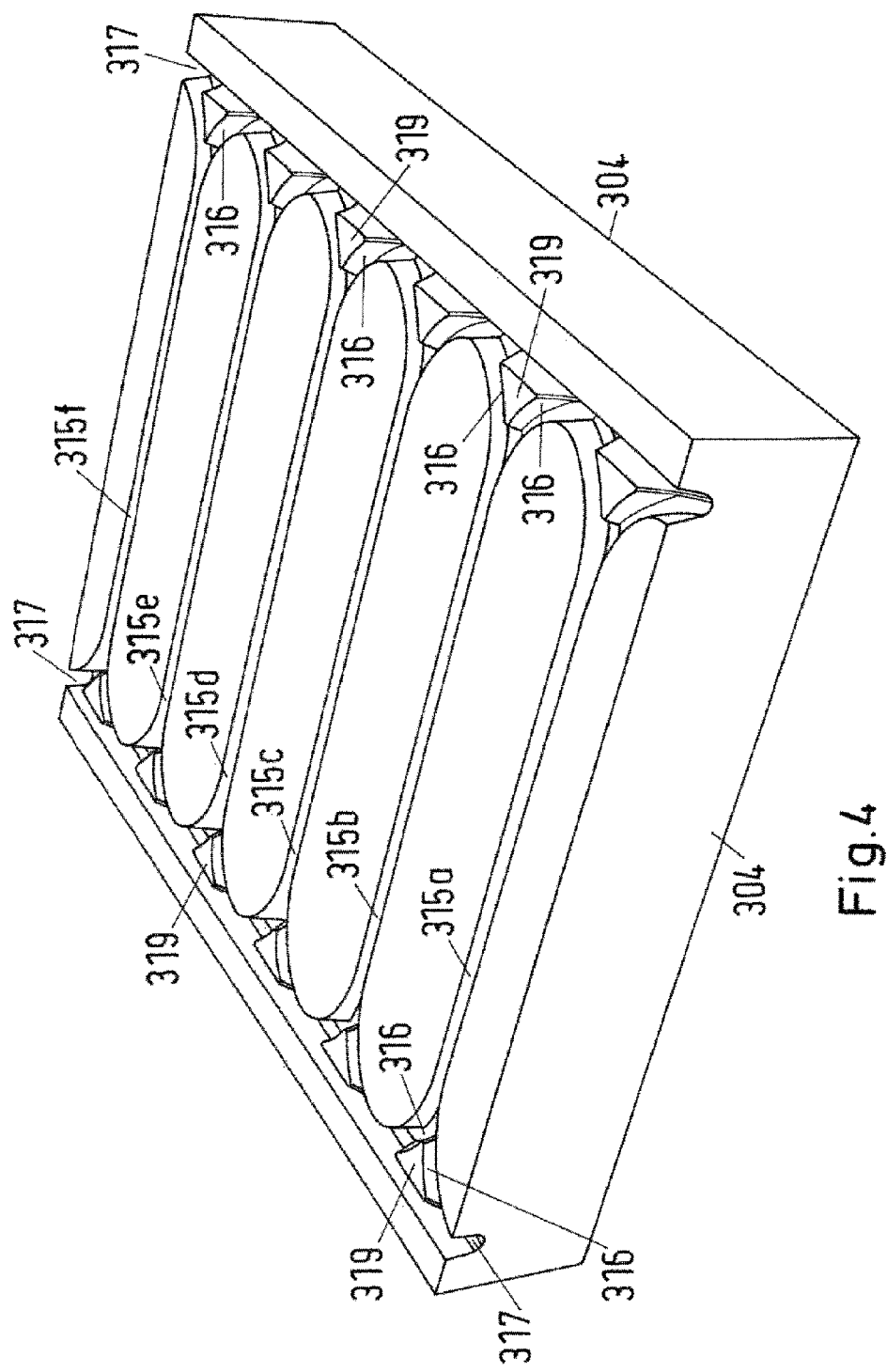

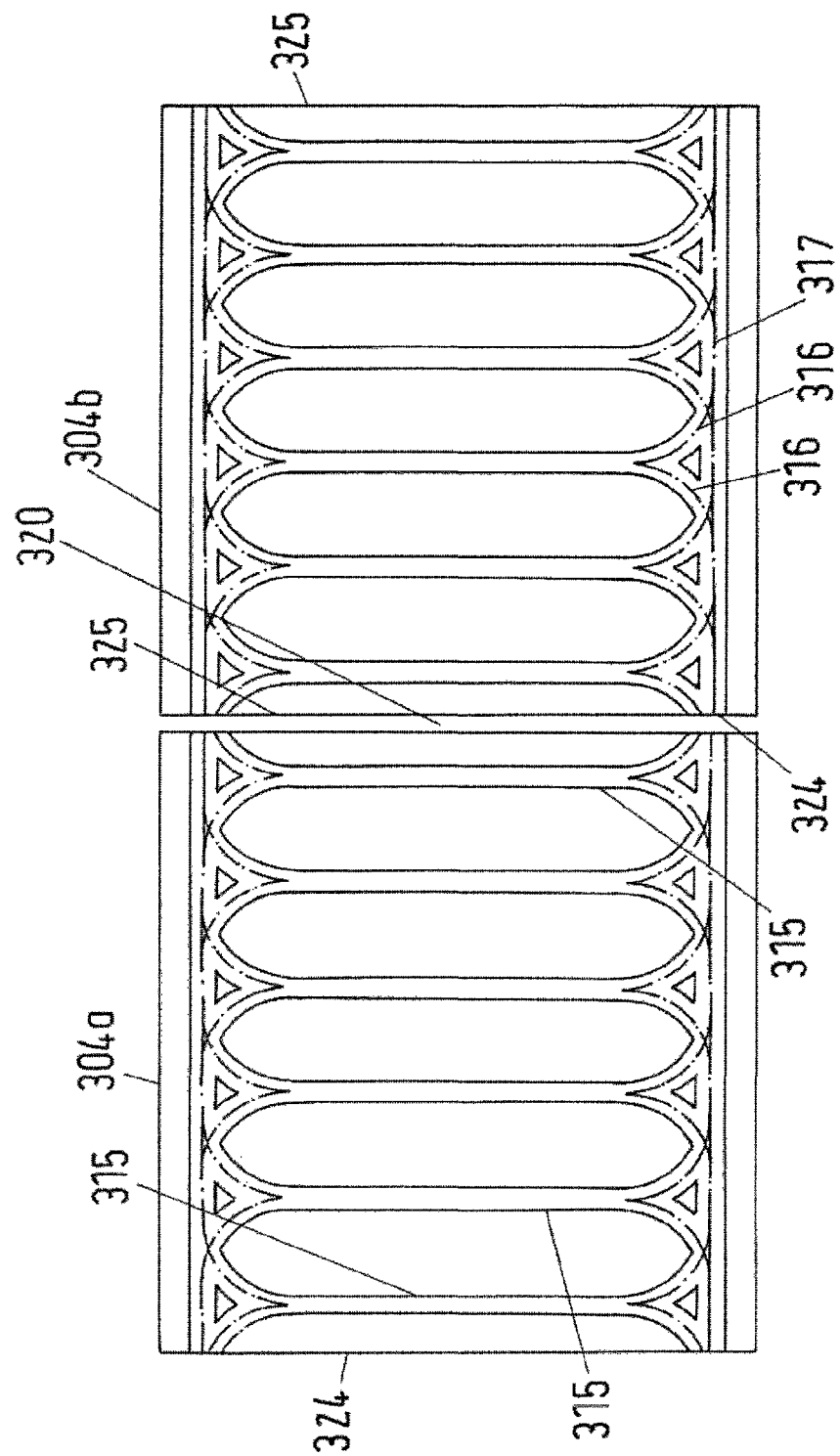

CONDUCTOR ARRANGEMENT FOR PRODUCING AN ELECTROMAGNETIC FIELD AND ROUTE FOR VEHICLES, IN PARTICULAR FOR ROAD AUTOMOBILES, COMPRISING THE CONDUCTOR ARRANGEMENT

CROSS-REFERENCE TO RELATED APPLICATIONS

This application is the United States national phase of International Application No. PCT/EP2012/063821 filed Jul. 13, 2012, and claims priority to United Kingdom Patent Application No. 1112098.7 filed Jul. 13, 2011, the disclosures of which are hereby incorporated in their entirety by reference.

BACKGROUND OF THE INVENTION

Field of the Invention

The invention relates to a conductor arrangement for producing an electromagnetic field and thereby transferring energy to vehicles driving on a surface of a route, in particular a route for road automobiles. The invention also relates to a route comprising the conductor arrangement, a method of building the conductor arrangement and a method of building the route. The vehicle can be, for example, a road automobile having wheels which can be steered by a driver of the vehicle. However, it is also possible that a track-bound vehicle travels on the route, such as a rail vehicle driving on rails which are embedded in the route.

Description of Related Art

While travelling on a route vehicles require energy for driving (i.e. propulsion) and for auxiliary equipment which does not produce propulsion of the vehicle. Such auxiliary equipment includes, for example, lighting systems, heating and/or air-conditioning systems, ventilation and passenger information systems. Not only track-bound vehicles (such as trams), but also road automobiles can be operated using electric energy. If continuous electric contact between the travelling vehicle and an electric rail or wire along the route is not desired, electric energy can be either withdrawn from an on-board energy storage or can be received by induction from an arrangement of electric lines of the route.

The transfer of electric energy to the vehicle by induction forms a background of the invention. The route side (primary side) conductor arrangement produces an electromagnetic field. The field is received by a coil (secondary side) on board of the vehicle so that the field produces an electric voltage by induction. The transferred energy may be used for propulsion of the vehicle and/or for other purposes such as providing the auxiliary equipment of the vehicle with energy.

Generally speaking, the vehicle may be, for example, a vehicle having an electrically operated drive motor. However, the vehicle may also be a vehicle having a hybrid drive system, e.g. a system which can be operated by electric energy or by other energy, such as energy provided using fuel (e.g. natural gas, diesel fuel, petrol or hydrogen).

WO 95/30556 A2 describes a system wherein electric vehicles are supplied with energy from the roadway. The all-electric vehicle has one or more on-board energy storage elements or devices that can be rapidly charged or supplied with energy obtained from an electrical current, for example a network of electromechanical batteries. The energy storage elements may be charged while the vehicle is in operation. The charging occurs through a network of power coupling elements, e.g. coils, embedded in the track. Induction coils are located at passenger stops in order to increase passenger safety.

In contrast, the focus of the present invention is to continuously transfer energy to the vehicle while it travels on the route. WO 2010/031596 A2 discloses a shaped block for positioning and/or holding a plurality of line sections of one or more electric lines along a driving way of a vehicle, wherein the shaped block has a plurality of recesses and/or projections, wherein the edges of the recesses and/or projections for the line sections in each case form the boundary of a space, into which one of the line sections can be brought, so that it extends in a longitudinal direction of the space, and wherein the longitudinal directions of the spaces, delimited by the edges of the recesses and/or by the projections, extend essentially parallel to one another in a common plane.

If an alternating electric current flows through the electric lines, an electromagnetic field is produced that induces an electric current in a receiver of a vehicle which is travelling on the driving way. The shaped blocks facilitate the laying of the electric lines in the driving way. WO 2010/031596 A2 discloses ways of integrating the shaped blocks in railways for rail vehicles. For example, the shaped blocks are placed in between the rails, the electric lines are laid into the spaces defined by the blocks and the blocks are covered by lids.

U.S. Pat. No. 4,836,344 discloses an electrical modular roadway system adapted for transmitting power to vehicles and controlling inductively coupled vehicles travelling thereon. The system comprises a plurality of elongated, electrically connected inductor modules arranged in an aligned end to end spaced apart order to form a continuous vehicle path. Each module has a magnetic core and power windings which generate a magnetic field extending above the road surface. The modules are embedded in the ground so as to be flush with the roadway surface over which a vehicle can travel. Each module is an elongated structure of uniform width and thickness so that they can be easily fabricated in quantity and readily installed in a roadbed with a minimum of labor and equipment. Each module comprises an iron core around which is wrapped a power winding comprising a series of coils.

The arrangement of these modules has disadvantages with respect to a reduced robustness and increased effort for building and maintenance of the roadway. Although the modules are pre-fabricated before they are laid on the route, electric connections between consecutive modules need to be assembled on site. Therefore, dirt and water may cause corrosion and cracks, especially in winter and enhanced by vibrations which always happen while vehicles travelling on the route.

As mentioned above, the shaped block or the inductor modules facilitate arranging the electric lines in the desired manner. The blocks or modules can be pre-fabricated. However, the blocks or modules are comparatively heavy. Furthermore, the electric line or lines should be protected against at least some of the substances which are typically used during construction of routes for vehicles.

SUMMARY OF THE INVENTION

It is an object of the present invention to facilitate the construction of routes for land vehicles, wherein the routes comprise conductor arrangements for producing an electromagnetic field in order to transfer energy to the vehicles driving on the route. In particular, it shall be possible to equip existing routes with such a conductor arrangement.

According to a basic idea of the present invention, it is proposed to provide a pre-fabricated conductor arrangement, but not to integrate the conductor arrangement into blocks or modules before the route is actually constructed. Consequently, the weight of the pre-fabricated conductor arrangement is smaller compared to solid blocks or modules. Furthermore, the thickness (in vertical direction) of the pre-fabricated arrangement can be smaller compared to the shaped blocks and modules.

According to a further basic idea, the conductor arrangement is placed in the interior of a covering during fabrication of the pre-fabricated arrangement. The interior of the covering may be the interspace of coating layers and/or a hermetically sealed space. Any variant of the two following principles is also possible: a) the interior is covered by coating layers, but comprises openings to the ambience, or b) the interior is hermetically sealed. In any case, it is preferred that the coating layers are thin and sheet-like, such that textile layers, non-woven fibre layers, foils, membranes or any combination thereof. It is also possible that at least one of the coating layers does not exist as a continuous layer before manufacturing the pre-fabricated conductor arrangement. For example, a liquid material and/or sheet-like pieces may be provided and may be used to form the coating layer. For example, the sheet-like pieces may be textile mats. The material of the mats may be the same material as mentioned above (for example foil or non-woven material comprising fibres).

In particular or alternatively, the coating layer may be flexible, at least before the electric line(s) are connected to the coating layer. In any case, it is preferred that the coating material of the pre-fabricated conductor arrangement follows (conforms to) the outline of the at least one electric line. In contrast to the shaped blocks mentioned above, at least one of the upper and lower surfaces of the pre-fabricated conductor arrangement is therefore not flat, but comprises protrusions where the electric line(s) extend(s). One advantage of this feature is that firmly embedding the pre-fabricated conductor arrangement is facilitated.

For example, the sheet-like material may be a mesh, such as made of polymer elements, e.g. polypropylene or polyethylene terephthalate (PET) elements. Such meshes are offered, for example, by Naue GmbH & Co. KG, 32339 Espelkamp, Germany, under the German registered trademark "Combigrid", registration number 39965958. This type of mesh has welded junctions and also comprises non-woven components for reinforcement. The polymer mesh elements which are contacted to each other at the welded junctions may be monolithic and the non-woven components may be textile elements comprising fibres.

An alternative sheet-like material is a so-called stress absorbing membrane interlayer (SAMI). Such SAMI-layers are known in the field of route construction for covering layers comprising cracks. Preferred SAMI-layers for the purpose of the present invention comprise hydrocarbons. Therefore, and the same applies to the mesh mentioned above having also hydrocarbon components, an asphalt layer as cover layer forms an excellent contact or chemical compound with the sheet-like material.

In particular, the coating layers may comprise through-holes which extend through the pre-fabricated conductor arrangement. Therefore, the materials of the layers below and above the conductor arrangement may contact each other through the through-holes, so that there is excellent contact between these layers and the pre-fabricated conductor arrangement is firmly held in place.

Furthermore, it is preferred that the coating layers and/or additional material (such as resin) is/are used to fix the at least one line of the electric conductor arrangement in a desired position, i.e. different sections of the at least one electric line are fixed relative to each other via the coating layers and/or the additional material. This does not exclude the case that the pre-fabricated conductor arrangement is still flexible in shape to some extent. However, in this case it is preferred that the desired relative positions of the different sections are achieved by unfolding, unrolling or placing the coating layers in another manner, thereby bringing the different sections in the desired position relative to each other and to other parts of the route.

The electric line or lines may follow a meandering path which extends in the direction of travel.

According to a preferred embodiment, the at least one electric line shall be placed within the route so that the line or lines extend(s) in serpentine-like manner, i.e. each line comprises sections which extend in the direction of travel and comprises sections extending transversely to the direction of travel. In this case, the coating layers and/or the additional material are connected to the electric line or lines so that the serpentine-like arrangement of the electric line or lines is achieved by placing the coating layers on site. In particular, the coating layers may be placed so as to extend essentially within a horizontal plane (for example with the exception of some corrugations at least at the attached line or lines).

The coating layers may be fixed to each other and/or to the electric line or lines indirectly using additional material (such as resin and/or adhesive material) and/or directly (e.g. by thermal fusion).

Different layers of the coating material may be parts of the same sheet material. For example, these different layers may be achieved by folding the layers on top of each other. Folding the same sheet has the advantage that the different layers are firmly connected to each other in the folding region, saving work for establishing the connection.

The pre-fabricated conductor arrangement can be integrated in standard route construction material during the building (i.e. the construction process) of the route. During this process of integration on site (i.e. where the route is to be constructed) the coating layers protect the conductor arrangement from external influences, in particular dirt, water, chemicals which are used during the route construction and the coating layers may also insulate the at least one electric line with respect to heat transfer from route construction material (such as heated asphalt).

In particular, the following is proposed: A conductor arrangement for producing an electromagnetic field and thereby transferring energy to vehicles driving on a surface of a route, in particular for transferring energy to road automobiles, wherein the conductor arrangement comprises:
  a lower coating layer,
  an upper coating layer and
  at least one electric line which—if arranged as part of the route—extends under the
    surface of the route in and/or about the travelling direction of the vehicles, wherein the at least one electric line is placed in between the lower and upper coating layer.

Furthermore, a route is proposed for vehicles driving on a surface of the route, in particular for road automobiles, wherein the conductor arrangement is embedded in material of the route, so that the electric line or lines extend(s) along the surface of the route in and/or about the travelling direction of vehicles which are driving on the route. The conductor arrangement and the route material embedding the conductor arrangement may be covered by at least one additional cover layer of the route, in order to protect the conductor arrangement and to improve the bearing strength of the route.

The invention also includes a method of manufacturing a conductor arrangement, which is adapted to produce an electromagnetic field and thereby to transfer energy to vehicles driving on a surface of a route, in particular to transfer energy to road automobiles, wherein the following steps are performed:
- providing a lower coating layer,
- providing an upper coating layer,
- placing at least one electric line in between the lower and upper coating layer to form a pre-fabricated conductor arrangement comprising the lower and upper coating layer as well as the at least one electric line.

Furthermore, the intervention includes a method of building a route for vehicles driving on a surface of the route, in particular for road automobiles, wherein the pre-fabricated conductor arrangement is embedded in route building material of the route, which route building material is adapted to carry the weight of vehicles driving on the route, wherein the conductor arrangement is arranged so that the least one electric line extends under the surface of the route in and/or about the travelling direction of the vehicles.

The lower and upper coating layer are preferably connected to each other at connection areas on opposite sides of the at least one electric line so that the at least one electric line is enclosed by the lower and upper coating layer and optionally by additional material establishing the connection of the lower and upper coating layer.

For example, the lower and upper coating layers may extend essentially within a horizontal plane, with the exception of corrugations where the at least one electric line is located. In this case, the connected areas are located on opposite sides of the electric line within the horizontal plane.

Preferably, there is a plurality of connection areas on each of the opposite sides of the electric line or lines. Furthermore, the conductor arrangement may have connection areas on the opposite sides which extend along the extension of the at least one electric line. In this manner, the electric line or lines is/are sealed against the ambience, at least on the side or sides where the connection area extends.

According to a particular embodiment, the at least one electric line of the pre-fabricated conductor arrangement can be sealed completely, by the lower and upper coating layers and, optionally, by additional material between the coating layers and/or additional material between one of the coating layers and the line. A complete sealing does not exclude that connections of the at least one line protrude from the pre-fabricated conductor arrangement. These connections may be sections of the line or lines which are not covered by a coating layer. The connections may connect the line(s) to electric and/or electronic devices, such as inverters and/or switches. During construction of the route, the connections can be placed within a metal trough or other cavity which remains free of route building material (such as asphalt), for example.

The following embodiment increases stability of the pre-fabricated conductor arrangement with respect to the relative positions of different sections of the at least one electric line.

At least one position holder may be located in between the lower and upper coating layer, wherein the position holder connects at least one section of the at least one electric line with another section of the line and/or with a section of another electric line for holding the sections in position relative to each other. The position holder may be made of solid state material and may be placed in between the sections of the electric line or lines before the upper coating layer is placed on top of the lower coating layer and the electric line or lines.

According to a preferred way of manufacturing the pre-fabricated conductor arrangements, the following steps are performed:
- the lower coating layer is placed upon a positioning device for positioning and/or holding a plurality of line sections of the at least one electric line, wherein the positioning device comprises recesses forming spaces and/or comprises projections delimiting spaces, wherein the spaces are adapted to receive at least one of the line sections and wherein the spaces are ready to receive the line sections despite the lower coating layer which covers the positioning device,
- the electric line or lines are placed upon the lower coating layer so that it/they contact the positioning device indirectly via the lower coating layer and so that it/they extend(s) through the spaces defined by the positioning device,
- the upper coating layer is placed upon the at least one electric line and upon areas of the lower coating layer which are not covered by the at least one electric line to form the pre-fabricated conductor arrangement and
- the pre-fabricated conductor arrangement is removed from the positioning device.

The coating layers which are used in this manufacturing process, are preferably deformable without applying heat to the coating layer material. Therefore, the lower coating layer will be deformed so as to follow the limits of the spaces. The deformation will take place before and/or while the at least one electric line is placed within the spaces. The upper coating layer may also be deformable without applying heat. However, it is also possible that at least one of the coating layers is deformed with the aid of heat in order to follow the surface of the at least one electric line. For example, the positioning device may be heated and/or the heat may be applied otherwise, for example by radiation or heated gas.

As mentioned above, additional material may be placed in the interior of the pre-fabricated conductor arrangement for forming connections between the coating layers and/or between at least one of the coating layers and the at least one line. One way to insert the additional material is to evacuate gas from the interior and to use the vacuum for establishing a flow of the material into the interior (i.e. into the interspace between the lower and upper coating layer).

The additional material may be a resin which can be cured by cooling the heated material.

The route for vehicles driving on a surface of the route, in particular for road automobiles, may comprise at least one cover layer which cover(s) the pre-fabricated conductor arrangement. The cover layer or one of the cover layers may be a surface layer forming the surface of the route on which vehicles can travel. The preferred material is asphalt, which preferably forms a continuous (in particular approximately horizontal) cover layer which covers the pre-fabricated conductor arrangement.

Optionally, the route building material of different layers or regions of the route may be of the same type. The "same type of material" means that at least one component of the material is formed by the same chemical substance or by a similar chemical substance so that neighbouring regions of the same material have excellent surface contact or even form a common chemical compound. For example, this is the case with the material asphalt which contains bitumen (i.e. a type of hydrocarbons) as a component. However, the additional components of asphalt may vary, i.e. all types of asphalt contain bitumen, but may contain different additives (in particular stones).

Preferably, the route comprises gaps between consecutive sections of the route in the direction of travel, wherein the gaps extend perpendicular to the direction of travel and allow relative movement between the consecutive sections of the route due to movement of the underground and/or due to thermal expansion and contraction. Typically, these gaps are filled by elastically deformable material. It is preferred that the pre-fabricated conductor arrangement extends continuously across the gap between the consecutive sections of the route. This means that no additional electric connection is to be made at the gap which connects different electric lines, for example electric connectors or soldered electric connections. In particular, the electric line or lines preferably have a continuous electric insulation extending along the line. Since electric lines, including their insulation, are typically elastically deformable to some extent, the electric lines extending across the gap deform in a corresponding manner to the extension or compression of the gap. It is preferred that the other components of the pre-fabricated conductor arrangement are also elastically deformable.

Therefore, the route can easily be built by first placing the pre-fabricated conductor arrangement, then applying the route construction material above the pre-fabricated conductor arrangement, therein leaving the at least one gap free of route building material and/or cutting out the gap(s) and finally treating the gaps in conventional manner, for example by filling the gaps with elastically deformable material.

The route may comprise a base layer which may be any suitable base layer. In particular the base layer may be made of sand cement, lean concrete or roller compacted concrete. There may be plural base layers on top of each other. However, the base layer may be an existing base layer of a route which has been used by vehicles. In this case, for example at least one layer above the base layer, or at least a part of the layer above the base layer can be removed from the existing route and the integrated layer and the cover layer may be placed above the base layer. The pre-fabricated conductor arrangement may be placed upon the base layer(s).

Preferably, a magnetic core material is integrated in the route. In particular, the magnetic core material (for example ferrite) is placed within a core space formed by recesses and/or delimited by projections of the base layer. For example, a groove may extend on the upper side of the base layer in the direction of travel of vehicles. Preferably, the magnetic core material is placed first in the respective core space and then the pre-fabricated conductor arrangement is placed upon the base layer. Consequently, it is preferred that the magnetic core material is placed below line sections of the electric line(s) of the pre-fabricated conductor arrangement. However, the magnetic core may alternatively be placed at another location within the route.

Preferably, some line sections which extend transversely to the direction of travel extend across the magnetic core if viewed from above. Therefore, strong magnetic poles can be produced by these line sections during energy transfer to a vehicle driving on the route.

Furthermore, it is preferred that the route comprises a shielding layer of electrically conducting material (for example aluminium) which is placed below the pre-fabricated conductor arrangement., Such a shielding layer shields the electromagnetic field produced by the electric line or lines so that requirements concerning electromagnetic compatibility of EMC are met. For example, other electric lines or pipings may be buried in the ground below the route which need to be protected against electromagnetic fields. Particularly preferred is that there is magnetic core material and, in addition, a shielding layer.

The route may be equipped with electric and/or electronic devices which are adapted to operate the electric conductor arrangement (the arrangement which comprises the electric line or lines which are located within the integrated layer). One of the devices may be an inverter for generating an alternating current from a direct current. The direct current may be carried by a supply line which supplies electric energy to the conductor arrangement. The alternating current may be the current which is carried by the conductor arrangement to produce the electromagnetic field. Since comparatively high powers are required by the vehicle (if—as preferred—a propulsion motor is operated with the energy), a corresponding power inverter produces significant energy losses in form of heat power. However, the electric and/or electronic device for operation of the electric conductor arrangement may comprise other types of devices, such as power switches to switch on and off a section of the electric conductor arrangement, constant current devices for providing constant current through the electric line or lines, detection devices for detecting the presence of a vehicle, star point connections for electrically connecting a plurality of electric phase lines and other devices.

These devices can be arranged in boxes or other casings above ground. Therefore, the heat losses produced by the devices can easily be transferred to the ambience. However, this may result in unacceptable noise production if ventilators are used to force the cooling of the devices. Furthermore, especially within historic parts of cities, casings above ground are not acceptable. Therefore, at least some of the devices may be buried in the ground, e.g. sideways of the route and/or within a cut-out or cavity of the route. In particular, a cut-out or cavity of the route may be used to reduce emission of electromagnetic fields to the environment.

The electric conductor arrangement of the route which produces the electromagnetic field may
  comprise at least one electric line extending along the path of travel of the vehicle in a serpentine manner (i.e. sections of the line which extend in the direction of travel are followed in each case by a section which extends transversely to the travel direction which in turn is followed again by a section which extends in the direction of travel and so on, which can also be called "meandering"); in case of a plural-phase system preferably all lines of the conductor arrangement are arranged in this manner; the expression "serpentine" covers lines having a curved configuration and/or having straight sections with curved transition zones to neighbouring sections; straight sections are preferred, since they produce more homogenous fields. Another expression for "serpentine manner" is "meandering".
  comprise at least two electric lines, wherein each line is adapted to carry a different one of phases of an alternating electric current; preferably, the electric conductor arrangement comprises three lines, each line carrying a different phase of a three-phase alternating current;
  comprise a plurality of segments, wherein each segment extends along a different section of the path of travel of the vehicle; each segment may comprise sections of the at least two lines and each segment may be combined with at least one device adapted to switch on and off the segment separately of the other segments. The phase line(s) of each segment may be electrically connected to the corresponding phase line of any consecutive segment (series connection of the phase lines). Alternatively, the phase line(s) of the consecutive segments may be insulated against each other and—for example—may be connected to the power supply via a separate inverter or switch for each segment (parallel connection of the phase lines). In case of a parallel connected phase lines, all phase lines of a segment may be connected to each other at a star point. The length of a segment in travel direction preferably differs from the length of a shaped module in travel direction. Preferably, cables constituting the electric line of a phase are not connected to a consecutive cable, within a segment. This facilitates the establishment of the construction. Preferably, each segment is made of at least one separate pre-fabricated conductor arrangement.

However, it is also possible that the same pre-fabricated conductor arrangement comprises electric lines of different segments.

BRIEF DESCRIPTION OF THE DRAWINGS

Examples and preferred embodiments of the invention will be described with reference to the attached figures which show FIG. 1 schematically a road having two lanes, wherein electric lines are laid under the surface of one of the lanes using pre-fabricated conductor arrangements, FIG. 1a a vertical cross section through a first embodiment of a pre-fabricated conductor arrangement, wherein the cross section may extend transversely to the direction of travel, FIG. 1b a vertical cross section similar to the cross section shown in FIG. 1a, however belonging to a second embodiment, FIG. 1c a schematic top view of the pre-fabricated conductor arrangement of FIG. 1a or FIG. 1b, FIG. 2 a vertical cross section through a preferred embodiment of a route, for example part of the road shown in FIG. 1, FIG. 3 an exploded view of the route shown in FIG. 2, FIG. 4 a perspective view of a preferred embodiment of a positioning device, which can be used for manufacturing a pre-fabricated conductor arrangement, and FIG. 5 a top view of two positioning devices of FIG. 4.

DESCRIPTION OF THE INVENTION

Figure 1:
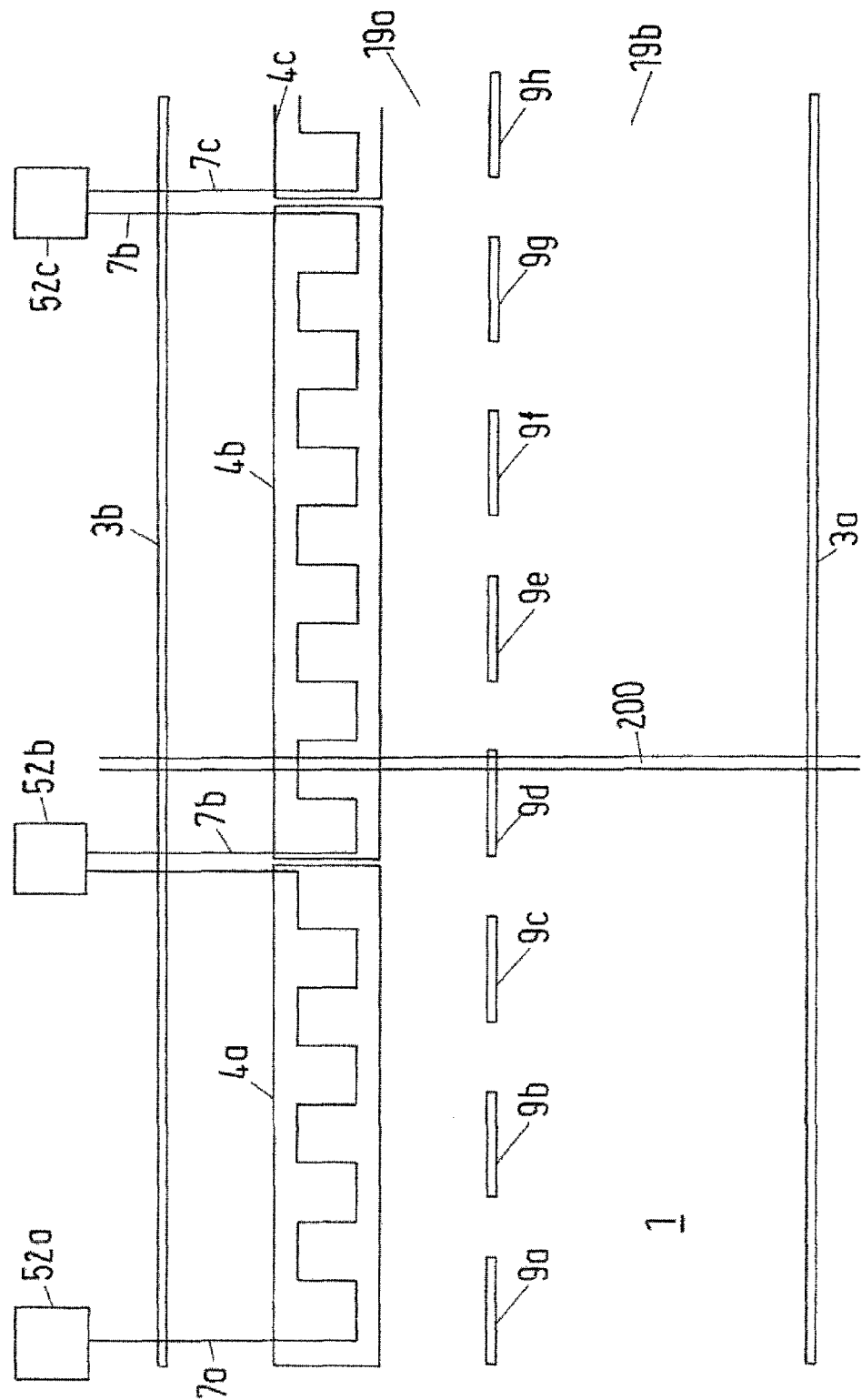

The schematic top view of FIG. 1 shows a road 1 having two lanes 19a, 19b. The lanes 19 are marked by solid, continuous lines 3a, 3b at the outer margins and are visually separated by a common dashed line made of line parts 9a, 9b, 9c, 9d, 9e, 9f, 9g, 9h. Consequently, the direction of travel extends from left to right or from right to left in FIG. 1. The width of the lanes 19 is large enough so that a vehicle can travel on either lane 19a or lane 19b or so that two vehicles can travel next to each other on the lanes 19.

One of the lanes, namely lane 19a, is equipped with a conductor arrangement 7a, 7b, 7c for producing an electromagnetic field. The conductors 7 (for example comprising three electric phase lines for producing a three-phase alternating current) are parts of a pre-fabricated conductor arrangement 4a, 4b, 4c, which hold the conductors in place while the route is constructed. However, due to a cover layer, the conductors are not visible in practice, if the finished road is viewed from above. However, FIG. 1 shows three consecutive conductor arrangements 4a, 4b, 4c. The line of consecutive pre-fabricated conductor arrangements 4a, 4b, 4c continues towards the right beyond the limits of FIG. 1. The total conductor setting comprises at least three consecutive segments 7a, 7b, 7c which can be operated separately of each other and each segment 7 is made using a single pre-fabricated conductor arrangement 4a, 4b, 4c. This means, for example, conductor 7a is operated while a vehicle (not shown) travels above the segment whereas the other segment 7b, 7c are not operated. If the vehicles reaches segment 7b, this segment is switched on and segment 7a is switched off. Corresponding switches and/or inverters may be integrated in devices 52a, 52b, 52c shown in the top region of FIG. 1.

The preferred way of laying the conductors 7 is to form a meandering path or meandering paths, which means that the conductor has sections that extend transversely to the direction of travel. For example, conductor 7a has eight transversely extending sections. The conductor 7a is connected to devices 52a, 52b.

In the middle section of FIG. 1 there are two parallel lines extending transversely to the direction of travel. These lines are lines at the end of route sections having a gap 200 between each other for allowing relative movement and/or thermal expansion or contraction. The gap 200 is not located between two consecutive pre-fabricated conductor arrangements 4, but conductor 7b of pre-fabricated conductor arrangement 4b extends across the gap 200 which may be filled with an elastically deformable material, such as bitumen.

Figure 1A:
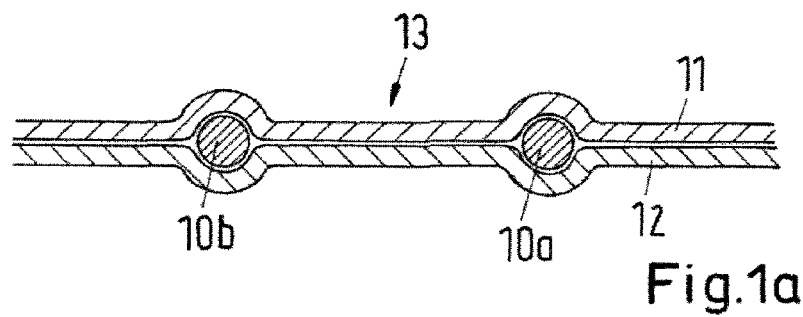

FIG. 1a shows a conductor arrangement 13 comprising a lower coating layer 12 and an upper coating layer 11 which are laid on top of each other. Except for regions where electric line sections 10a, 10b extend, the coating layers 11, 12 are in direct contact with each other at their surfaces.

Figure 1B:
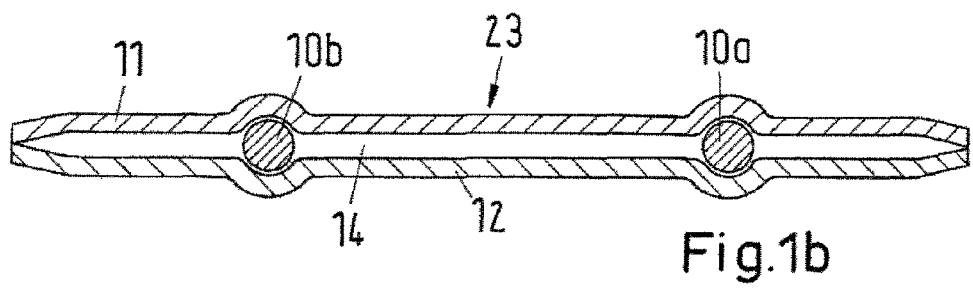

FIG. 1b shows a cross section through a second embodiment of a pre-fabricated conductor arrangement 23. In contrast to the arrangement shown in FIG. 1a, the lower coating layer 12 and the upper coating layer 11 are in direct contact with each other only at their margin regions, and indirectly contact each other elsewhere. The interior 14 of the conductor arrangement 23 which is delimited by the two coating layers 11, 12, is at least partly and preferably completely filled by an additional material, e.g. a resin. This means that the resin or other additional material forms an indirect connection of the two coating layers 11, 12 and the line sections 10a, 10b.

Figure 1C:
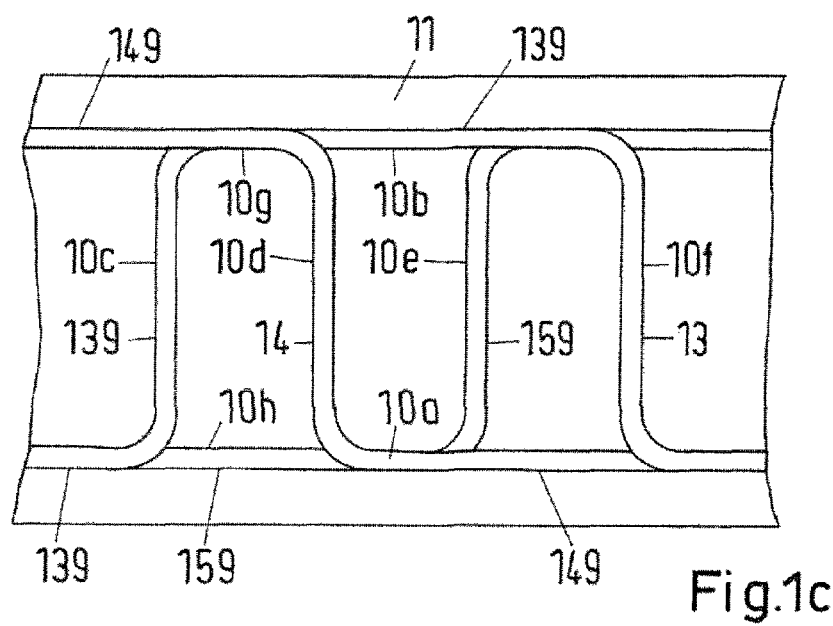

FIG. 1c shows three electric lines 139, 149, 159 which extend serpentine-like in and about the direction of travel (which extends from left to right in FIG. 1c). Following the extension of the first electric line 139 starting from the left in FIG. 1c, the electric line 139 turns left to extend transversely to the direction of travel with a line section 10c, then turns right to extend in the direction of travel with a line section 10b and again turns right to extend transversely to the direction of travel with a line section 10f and so on. The second electric line 149 also comprises a transversely extending section 10d in the region which is shown in FIG. 1c. A transversely extending section 10e of the third electric line 159 is also shown. The transversely extending sections of the three electric lines 139, 149, 159 form a repeating pattern in the direction of travel. This means, for example, that a transversely extending section of the second electric line 149 follows on the right hand side of FIG. 1c next. On the left hand side of FIG. 1c, a transversely extending section of the third electric line 159 follows next.

FIG. 1c also shows the outlines of the upper coating layer 11, which may be transparent so that the electric lines 139, 149, 159 are visible from above. Alternatively, FIG. 1c can be interpreted to show a schematic top view if the material of the upper coating layer 11 is not transparent.

Figure 2:
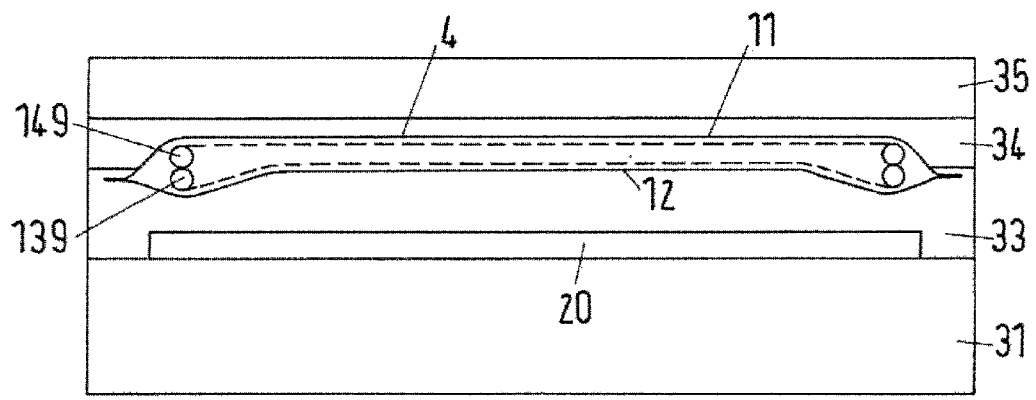

FIG. 2 shows a vertical cross section through a preferred embodiment of a route, wherein the direction of travel for vehicles travelling on the route extends perpendicularly to the image plane of FIG. 2. FIG. 2 may show, for example, a cross section of lane 19a of FIG. 1. Lane 19a comprises a base layer 31 which may have, for example, a layer thickness of 22 cm. On top of the base layer 31, a layer 20 of electrically conducting material (such as aluminium plates) is laid, for example having a thickness of 5 mm. The purpose of the layer 20 is to shield the electromagnetic field, i.e. to prevent or reduce electromagnetic waves below the layer 20. The layer 20 may be narrower than the width of the lane 19a and may be in the range of the width of pre-fabricated conductor arrangement 4 which is placed above layer 20.

Shielding layer 20 is partly embedded in an intermediate layer 33 which may have a thickness of 6 cm, for example. On top of intermediate layer 33, pre-fabricated conductor arrangement 4 is placed, which comprises, for example the line arrangement shown in FIG. 1c. Pre-fabricated conductor arrangement 4 may have a thickness of 4 cm, for example. In other embodiments, shielding layer 20 may be placed elsewhere, e.g. at a higher position within intermediate layer 33.

Pre-fabricated conductor arrangement 4 is covered and thereby partly embedded in a first cover layer 34 which is preferably made of asphalt, in particular mastic asphalt, to form a merely horizontal surface. A second cover layer 35 covers the first cover layer 34. The second cover layer 35 may also be made of asphalt and forms the surface layer of the road. Alternatively, a single cover layer may cover the conductor arrangement 4 and may also form the surface of the route. For example, the cover layer or cover layers may have a thickness of 5 cm.

It is preferred that the intermediate layer 33 is also made of asphalt so that the three layers 33, 34, 35 form a solid and long-lasting layer compound.

The coating layers 11, 12 of the pre-fabricated conductor arrangement 4 may comprise hydrocarbons so that a molecular compounds with adjoining asphalt layers can be established during construction of the route. The base layer may be made of sand cement or concrete.

Figure 3:
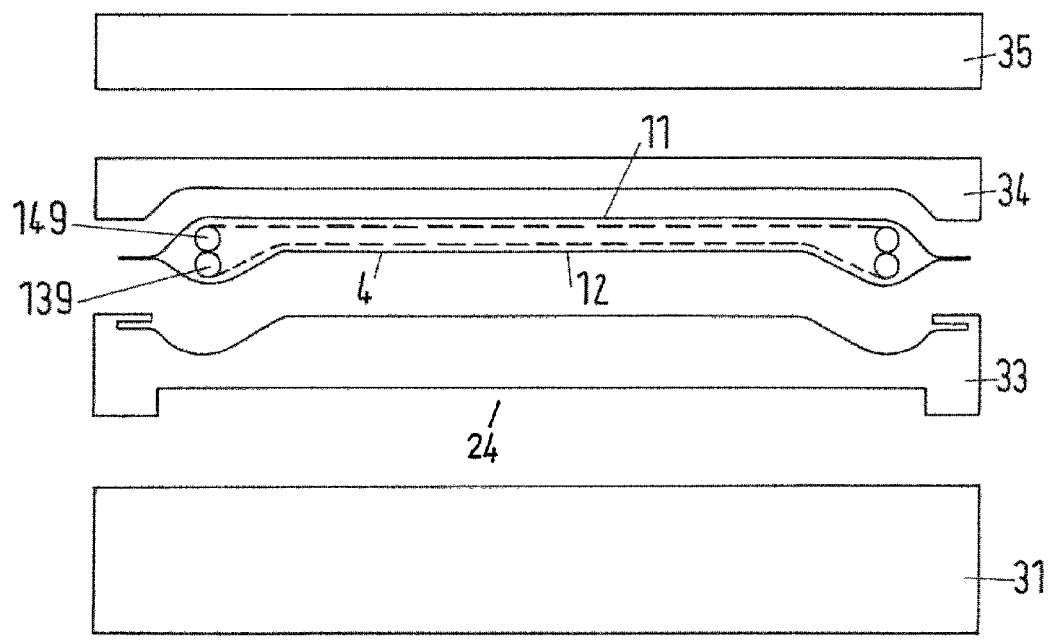

FIG. 3 shows an exploded view of the construction of the lane corresponding to the construction shown in FIG. 2. The same reference numerals refer to the same parts of the construction. Since shielding layer 20 is provided before intermediate layer 33 is produced, intermediate layer 33 will have a recess 24 where shielding layer 20 is located.

FIG. 4 shows a perspective view of a positioning device 304 and FIG. 5 shows a top view of an arrangement comprising two consecutive positioning devices 304a, 304b. The positioning device or arrangement of positioning devices is/are used to position the electric lines during the manufacture of a pre-fabricated conductor arrangement. The positioning device 304 comprises six recesses 315a-315f extending perpendicularly to a centre line which divides the block 304 in two halves. The centre line extends in the direction of travel of a vehicle (from lower left to upper right in FIG. 4 or from left to right in FIG. 5).

The recesses 315 are parallel to each other and are arranged within the same horizontal plane which is parallel to the plane of FIG. 5. The recesses 315 extend in width direction (from top to bottom in FIG. 5) over about three quarters of the total width of positioning device 304. They are arranged symmetrically to the centre line.

Each recess has a U-shaped cross-section to receive a cable. The dashed lines shown in FIG. 5 which extend along the recesses 315 are centre lines of the recesses 315. At each of the two opposite ends of the straight recesses 315, there are bifurcated curved recess regions 316 which form transitions to a peripheral straight recess 317 extending along the lateral edge of the positioning device 304. Cables can be laid in a manner consecutively extending from the straight recesses 315 through the curved recess region 316 into the peripheral straight recess 317, thereby changing the direction of extension from perpendicular to the direction of travel to parallel to the direction of travel. A corresponding example is shown in FIG. 1c.

The curved recess regions 316 allow for placing a cable, which extends through the recess 315, in such a manner that it continues to either the left or the right, if viewed in the straight direction of the recess 315. For example, a cable (not shown in FIGS. 4 and 5) may extend through recess 315b, may turn to the right—while extending through recess region 316—and may then extend through the straight recess 317 which extends perpendicularly to the recesses 315 on the opposite side of curved recess region 316. There are two peripheral straight recess regions 317 on opposite sides of block 304. The cable may then turn to the right through the recess region 316 at the end of recess 315e and may then extend through recess 315e. At the end of recess 315e, which is shown in the lower part of FIG. 5, the cable may again turn left through recess region 316 into the other straight recess 317. The other recesses 315 may be used for two other cables.

The depth (in vertical direction in FIG. 4) of the recesses 315, 316, 317 is different. The depth of recess 315 is sufficient to receive one cable. The depth of the curved recess region 316 increases from the end of recess 315 to recess 317. Each of the curved recess regions 316 comprises an island region 319 which is located between the two curved branches of the curved recess region 316. In addition, the island region 319 is located between the straight recess 317 and the two branches of the curved recess region 316.

Since the depth of the curved recess region 316 increases towards the straight recess 317, different cables can be laid upon one another. The depth of the straight recess 317 is sufficient to arrange two cables upon one another extending in the same straight direction. For example, a first cable may extend trough the lower recess 317 in FIG. 5 and may turn left into recess 315b through the recess region 316 shown in the bottom left part of FIG. 5. In addition, a second cable may extend trough recess 315a, may turn into the recess 317, thereby crossing (if viewed from above) the first cable.

The example concerning the extension of cables or electric lines given above refers to one specific application for laying three meandering cables. However, the use of the positioning device 304 shown in FIG. 4 and FIG. 5 is not restricted to this application. Rather, for example, less or more than three cables can be laid using the positioning device 304.

Each of the blocks 304a, 304b shown in FIG. 5 comprises the recesses 315, 316, 317 described above. Therefore, the arrangement shown in FIG. 5 can be used to manufacture a pre-fabricated conductor arrangement which is longer with respect to the direction of travel and, for example, comprises more transversely extending line sections.

In order to manufacture the pre-fabricated conductor arrangement, the lower coating layer is placed upon the positioning device 304 or arrangement of positioning devices 304*a,* 304*b,* first. Then, the cables are laid in the desired manner in the spaces defined by the recesses 315, 316, 317. Afterwards, the upper coating layer is laid upon the cables and the lower coating layer. Finally, the coating layers and/or the cables may be connected to each other.

The invention claimed is:

1. A pre-fabricated conductor arrangement for producing an electromagnetic field and thereby transferring energy to at least one vehicle driving on a surface of a route, wherein the conductor arrangement comprises:
a lower coating layer,
an upper coating layer,
at least one electric line,
wherein the at least one electric line is placed in between the lower and upper coating layers, and the lower and upper coating layers conform to an outline of the at least one electric line.

2. The conductor arrangement of claim 1, wherein the lower and upper coating layers are connected to each other at connection areas on opposite sides of the at least one electric line so that the at least one electric line is enclosed by the lower and upper coating layers.

3. The conductor arrangement of claim 2, further including additional material establishing the connection of the lower and upper coating layers.

4. The conductor arrangement of claim 3, wherein the connection areas on the opposite sides extend along the extension of the at least one electric line.

5. The conductor arrangement of claim 1, wherein at least one position holder is located in between the lower and upper coating layers, wherein the position holder connects at least one section of the at least one electric line with another section of the line and/or with a section of another electric line for holding the sections in position relative to each other.

6. A route for at least one vehicle driving on a surface of the route, wherein the conductor arrangement of claim 1 is embedded in material of the route, so that the at least one electric line extends under the surface of the route in a travelling direction of vehicles which are driving on the route.

7. The route of claim 6, wherein the conductor arrangement and the route material embedding the conductor arrangement are covered by at least one additional cover layer of the route.

8. The route of claim 6, wherein the at least one vehicle is a road automobile.

9. The conductor arrangement of claim 1, wherein the at least one vehicle is a road automobile.

10. A method of manufacturing a conductor arrangement, which is adapted to produce an electromagnetic field and thereby to transfer energy to at least one vehicle driving on a surface of a route comprising the steps of:
providing a lower coating layer,
providing an upper coating layer,
placing at least one electric line in between the lower and upper coating layers to form a pre-fabricated conductor arrangement comprising the lower and upper coating layers as well as the at least one electric line, wherein the lower and upper coating layers conform to an outline of the at least one electric line.

11. The method of claim 10, wherein the lower and upper coating layers are connected to each other at connection areas on opposite sides of the at least one electric line so that the at least one electric line is enclosed by the lower and upper coating layers.

12. The method of claim 11, further including additional material establishing the connection of the lower and upper coating layers.

13. The method of claim 12, wherein the connection areas on the opposite sides are established so as to extend along the extension of the at least one electric line.

14. The method of claim 10, wherein at least one position holder is placed, established, or placed and established in between the lower and upper coating layers, wherein the position holder connects at least one section of the at least one electric line with another section of the line, with a section of another electric line, or with another section of the line and the section of another line so that the position holder holds the sections in position relative to each other.

15. The method of claim 10, wherein the at least one vehicle is a road automobile.

16. A method of manufacturing a conductor arrangement, which is adapted to produce an electromagnetic field and thereby to transfer energy to at least one vehicle driving on a surface of a route comprising the steps of:
providing a lower coating layer,
providing an upper coating layer,
placing at least one electric line in between the lower and upper coating layers to form a pre-fabricated conductor arrangement comprising the lower and upper coating layers as well as the at least one electric line, wherein
the lower coating layer is placed upon a positioning device for positioning, holding, or positioning and holding a plurality of line sections of the at least one electric line, wherein the positioning device comprises recesses forming spaces, comprises projections delimiting spaces, or comprises recesses forming spaces and comprises projections delimiting spaces, wherein the spaces are adapted to receive at least one of the line sections and wherein the spaces are ready to receive the line sections despite the lower coating layer which covers the positioning device,
the at least one electric line or lines is placed upon the lower coating layer so that the at least one electric line or lines contacts the positioning device indirectly via the lower coating layer and so that the at least one electric line or lines extends through the spaces defined by the positioning device,
the upper coating layer is placed upon the at least one electric line and upon areas of the lower coating layer which are not covered by the at least one electric line to form the pre-fabricated conductor arrangement, and
the pre-fabricated conductor arrangement is removed from the positioning device.

17. A method of building a route for vehicles driving on a surface of the route, in particular for road automobiles, wherein the pre-fabricated conductor arrangement of claim 16 is embedded in route building material of the route, which route building material is adapted to carry the weight of vehicles driving on the route, wherein the conductor arrangement is arranged so that the least one electric line extends under the surface of the route in a travelling direction of the vehicles.

* * * * *